Jan. 14, 1936.  C. E. RUTHERFORD  2,027,619
CONDUIT FOR ELECTRIC WIRING
Filed April 27, 1935
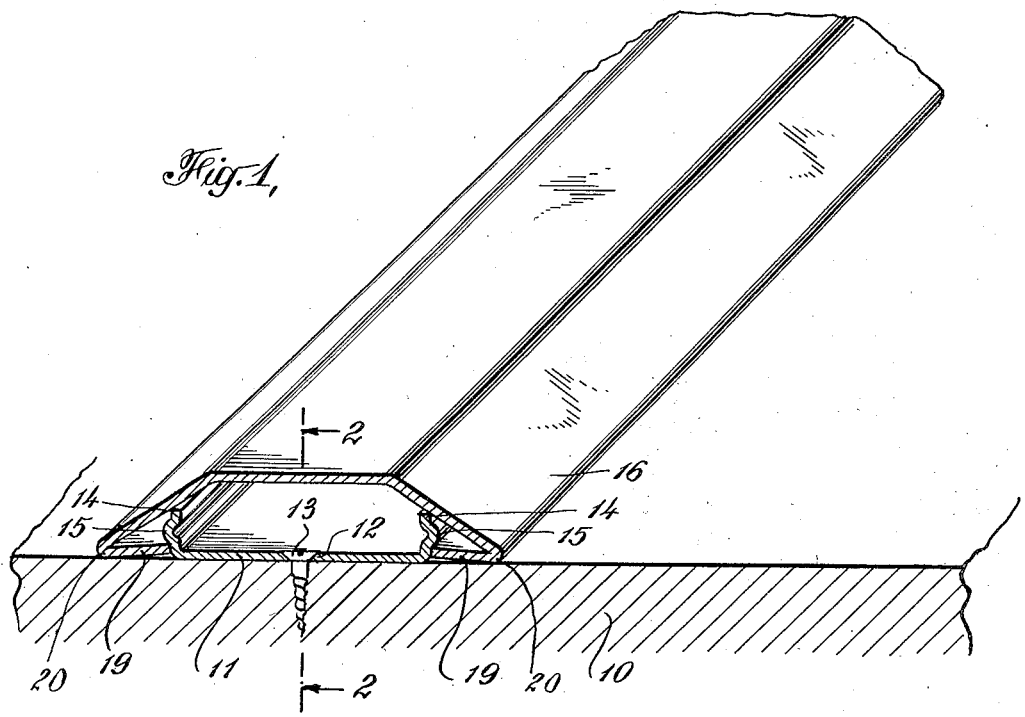
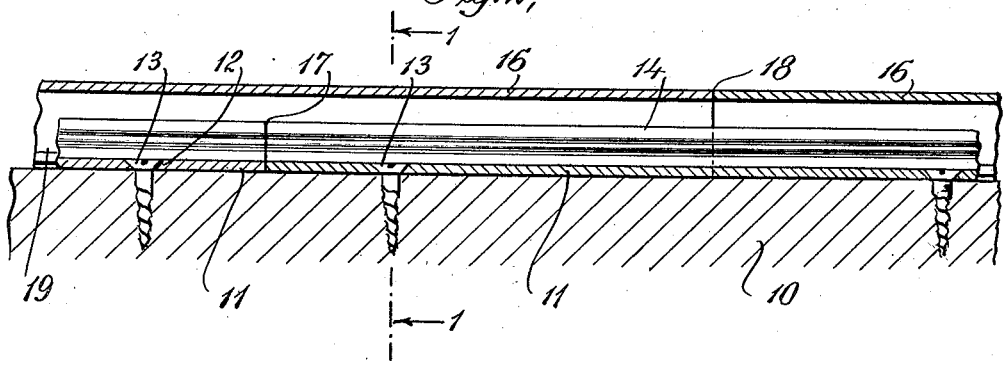
INVENTOR
CHARLES E. RUTHERFORD
BY
ATTORNEYS Patented Jan. 14, 1936

2,027,619

UNITED STATES PATENT OFFICE 2,027,619

CONDUIT FOR ELECTRIC WIRING

Charles E. Rutherford, West Hartford, Conn., assignor to The Wiremold Company, Hartford, Conn., a corporation of Connecticut Application April 27, 1935, Serial No. 18,555

1 Claim. (Cl. 247—37)

My invention relates to conduits for electric wiring. Its object is to provide a conduit which can be used as an overfloor raceway, which is cheap, simple, strong, easy to install and safe, and which, when installed on the floor of a room, does not project in such a way as to present an obstacle to a person walking over the floor, particularly an obstacle over which a person will be likely to trip or stumble.

In the accompanying drawing

Fig. 1 is a view, partly in elevation section on the line 1—1 of Fig. 2, of my conduit installed on a floor;

Fig. 2 is a longitudinal section on the same scale on the line 2—2 of Fig. 1.

10, in Fig. 1, is a floor; 11 is the base member of the raceway, which is formed of metal in the shape of a channel capable of receiving electric wires, and is provided at intervals with countersunk holes 12 for screws 13 by which it is fastened to the floor. The lateral vertical side portions, 14, of the channel 11 are bent to form projections or beads 15.

16 is the cover member, also of metal, which is made in the form of ramp or threshold, and which at its edges 20 comes substantially in contact with the floor so that when it is installed on the floor it will not present an obstacle over which a person will trip or stumble.

The vertical projecting side portions 14 of the channel member 11 are of such length that when the cover member 16 is put in place the lower side of that cover member rests upon and is supported at two points by the side portions 14 whereby additional strength, rigidity and resistance to deformation are afforded.

In the installation of my conduit the necessary number of lengths of the channel member 11 are laid end to end upon the floor and fastened to it by the screws 13; a joint between two such sections as shown at 17, Fig. 2. Subsequently lengths of the cover member 16 are installed in such a way as to break joints with the channel member, a joint of the cover member being shown at 18, Fig. 2. The cover member 16 is applied by simply pressing it down upon the already installed channel member 11, so that the internally projecting portions 19 of the cover member snap over and are held in place by the beads 15 on the channel member, the metal of one or both members being thin enough to provide sufficient temporary yield or spring for that purpose.

While the device may be made of the size shown in the drawing, for most uses it can be made smaller.

I claim:

In a conduit for electric wiring suitable for installation as a floor raceway, a channel member adapted to be fastened to the floor and having upwardly extending flanges, said channel member being adapted to receive electric wires, a cover member of substantially greater width than said channel member for closing said channel and adapted to extend into substantial contact with the floor at its outer edges, said cover member being so shaped as not to present an obstacle to a person walking over the floor and having flanges extending inwardly from the outer edges thereof, the two members together constituting an enclosure for electric wires, projections on the upwardly extending flanges of said channel member cooperating with the inwardly extending flanges on the cover member to hold the cover member in place after it is snapped onto the channel member, the said upwardly extending flanges of said channel member tending to support the upper portion of the cover member whereby additional strength and rigidity are secured.

CHARLES E. RUTHERFORD.